United States Patent
Wan

(10) Patent No.: US 12,465,034 B1
(45) Date of Patent: Nov. 11, 2025

(54) AUTOMATIC WINDING MACHINE AND AUTOMATIC WINDING METHOD

(71) Applicant: Uniprime Outdoors LLC, Boca Raton, FL (US)

(72) Inventor: Jun Wan, Boca Raton, FL (US)

(73) Assignee: Uniprime Outdoors LLC, Boca Raton, FL (US)

( * ) Notice: Subject to any disclaimer, the term of this patent is extended or adjusted under 35 U.S.C. 154(b) by 0 days.

(21) Appl. No.: 19/215,587

(22) Filed: May 22, 2025

(51) Int. Cl.
*A01K 89/01* (2006.01)
*A01K 89/015* (2006.01)

(52) U.S. Cl.
CPC .. *A01K 89/01903* (2015.05); *A01K 89/01925* (2015.05)

(58) Field of Classification Search
CPC .. A01K 89/003; B65H 49/205; B65H 49/325; B65H 59/02
See application file for complete search history.

(56) References Cited

U.S. PATENT DOCUMENTS

| | | | | |
|---|---|---|---|---|
| 3,216,145 A | * | 11/1965 | Aunspaugh | A01K 89/017 43/21.2 |
| 3,704,840 A | * | 12/1972 | Haddock | A01K 89/003 242/570 |
| 4,007,886 A | * | 2/1977 | Kaminstein | A01K 89/003 242/596.7 |
| 4,310,126 A | * | 1/1982 | Norleen | B65H 54/54 242/615.3 |
| 4,588,139 A | * | 5/1986 | Lines | A01K 89/003 242/570 |
| 5,163,632 A | * | 11/1992 | Chilcoat | B65H 75/143 242/486.9 |
| 5,709,350 A | * | 1/1998 | Davis | B65H 54/2812 242/390.8 |
| 5,725,172 A | * | 3/1998 | Koehler | A01K 89/00 242/395 |
| 5,794,883 A | * | 8/1998 | MacEwen | B65H 49/26 242/563.2 |
| 9,016,614 B1 | * | 4/2015 | Pouncil | A01K 89/003 242/598.5 |
| 9,693,545 B1 | * | 7/2017 | McIntyre | A01K 89/003 |

(Continued)

FOREIGN PATENT DOCUMENTS

| | | |
|---|---|---|
| CN | 209210059 U | 8/2019 |
| CN | 212356030 U | 1/2021 |
| CN | 217690773 U | 10/2022 |

(Continued)

*Primary Examiner* — Emmanuel M Marcelo
(74) *Attorney, Agent, or Firm* — Nitin Kaushik

(57) ABSTRACT

An automatic winding machine and method are disclosed. The system includes a line feeding assembly, a winding assembly, an automatic line guide assembly, and an interface screen. The line feeding assembly includes a spool holding frame for supporting a bulk spool of line. The winding assembly includes a reel spool holding clamp, a fishing reel holding clamp, and a winding motor for rotating either a reel spool or a reel handle. The automatic line guide assembly includes a line guide mechanism driven by a line guide motor to distribute line evenly. The interface screen regulates winding speed, spool width, and the line placement. The system provides fully automated, uniform spooling with adjustable tension and minimal labor.

9 Claims, 6 Drawing Sheets

(56) References Cited

U.S. PATENT DOCUMENTS

2018/0116193 A1* 5/2018 Rogers ................. A01K 89/003
2021/0307308 A1* 10/2021 Knight .................. B65H 49/34

FOREIGN PATENT DOCUMENTS

| DE | 202012007930 U1 * | 10/2012 | ......... A01K 899/003 |
| KR | 100363207 B1 * | 12/2002 | ........... A01K 89/003 |
| WO | WO-0074479 A1 * | 12/2000 | ........... A01K 89/003 |

* cited by examiner

AUTOMATIC WINDING MACHINE AND AUTOMATIC WINDING METHOD

TECHNICAL FIELD

The present application belongs to the technical field of fishing tackle, and particularly relates to an automatic winding machine and an automatic winding method.

BACKGROUND

When a fishing reel needs to have old line removed and new line installed reels such as baitcasting reels, conventional reels and spinning reels are spooled manually or semi-mechanically and semi-manually, which costs a lot of time and energy. Existing winding machines will wind the line on the reel or spool but to keep the line even and uniform a user must manually move the line side to side the entire duration of the process and maintain the constant tension on the spool to ensure the line goes on at the right tension. In addition, the existing winding machines on the market are not fully compatible with all fishing reels and spools, and do not meet all of the line winding and respooling needs of fishermen today. Therefore, it is necessary to develop an automatic winding machine that can automatically set the parameters of the width of the spool to keep the line even, the determined amount of line installed, and the tension that the line is kept at while installing which will allow more efficient respooling for fishing store and tackle shop owners.

SUMMARY

In view of the above problems, the present application discloses an automatic winding machine and an automatic winding method to overcome the above problems or at least partially solve the above problems.

In order to achieve the above purpose, in this application, the following technical solutions are adopted:

according to an aspect of the present application, an automatic winding machine is provided, including: a line feeding assembly, a winding assembly, an automatic line guide assembly and an interface screen;

the line feeding assembly includes a spool holding frame configured to mount a bulk spool of line for conveying fishing lines;

the winding assembly includes a reel spool holding clamp, a fishing reel holding clamp, and a first driving mechanism; the reel spool holding clamp and the fishing reel holding clamp are respectively configured to mount a winding spool or a fishing reel for receiving a fishing line; and the first driving mechanism is configured to drive the winding spool or the fishing reel to rotate so as to generate a winding traction force;

the automatic line guide assembly includes a line guide tip shaft and a second driving mechanism, and the line guide tip shaft is configured to guide the fishing line between the line feeding assembly and the winding assembly; and the second driving mechanism is configured to drive the line guide tip shaft to reciprocate in a direction parallel to the winding spool or an axis of the fishing reel to control the placement of the fishing line on the winding spool and the fishing reel; and the interface screen is electrically connected to the first driving mechanism and the second driving mechanism for controlling winding speed and winding area of the winding spool or fishing reel.

In some embodiments, the line guide tip shaft includes: a line guide roller, a line guide tip, a line guide gear rod, and an adjustment block; the line guide roller and the line guide tip are mounted on the adjustment block, and the adjustment block is slidably mounted on the line guide gear rod; the fishing line is routed the line guide roller and exits through the line guide tip; and the second driving mechanism is a line guide motor, the line guide gear rod is connected to an output end of the line guide motor, and the line guide motor drives the line guide roller and the line guide tip to reciprocate linearly by driving the line guide gear rod to rotate.

In some embodiments, the line guide tip shaft further includes: a line guide support and line guide shafts; an end of the line guide gear rod is mounted on the line guide support through a rotating bearing; the line guide shaft is fixedly mounted on the line guide support parallel to the line guide gear rod, and the line guide shaft is routed the adjustment block to guide linear movement thereof.

In some embodiments, the reel spool holding clamp includes: a spool holding adapter and an elastic clamping mechanism, both the spool holding adapter and the elastic clamping mechanism are detachable components; the spool holding adapter is provided with a fixing pin configured to engage with a positioning hole of the winding spool to drive the winding spool to rotate coaxially; the elastic clamping mechanism exerts pressure on the winding spool, securing it tightly against the spool holding adapter; and the first driving mechanism is a winding motor, an output end of the winding motor is detachably connected to the spool holding adapter, and the winding motor drives the winding spool to rotate by rotating the spool holding adapter to generate a winding traction force.

In some embodiments, the fishing reel holding clamp includes: a fishing reel mounting rod, which can be fixedly connected to a base of the fishing reel; and the output end of the winding motor is further equipped with a detachable reel handle turning arm which engages with a handle of the fishing reel, and the winding motor drives the reel handle turning arm to rotate the handle of the fishing reel, thereby generating a winding traction force.

In some embodiments, the spool holding frame includes a frame, a bulk spool holding disk, a bulk spool holding rod, and a spool locking collar; the bulk spool holding rod is rotatably mounted on the frame, the bulk spool holding disk is mounted on one side of the bulk spool holding rod, and the spool locking collar is mounted on the other side thereof; the bulk spool holding disk is provided with a fixing pin, which is configured to engage the bulk spool holding disk with a positioning hole on the bulk spool of line to secure it in place; and the spool locking collar presses the bulk spool of line against the bulk spool holding disk to prevent the bulk spool of line from disengaging.

In some embodiments, the bulk spool holding rod is a damping adjustable structure that can adjust the rotational resistance to accommodate different winding tensions required by various fishing lines.

In some embodiments, the line feeding assembly further includes a line counter, the line counter is mounted on the spool holding frame and electrically connected to the interface screen, serving to provide feedback to the interface screen regarding the line feeding length of the bulk spool of line.

In some embodiments, the interface screen includes a display mechanism and an input mechanism; the display mechanism is configured to display a winding speed and/or a winding length; the input mechanism is configured to set a start point and an end point of the winding position on the winding spool or the fishing reel; the interface screen causes the second driving mechanism to drive the line guide tip shaft to reciprocate between the start and the end points of the winding position; and the input mechanism is further configured to receive manual adjustment instructions to correct positional deviations of the line guide tip shaft during a winding process.

According to another aspect of the present application, an automatic winding method is provided, which is applied to the above automatic winding machine, and the method includes the steps of:

mounting a winding device on a winding assembly;

controlling by an interface screen an automatic line guide assembly to move to a first designated position of the winding device, and setting the first designated position as a start point for winding;

controlling by the interface screen the automatic line guide assembly to move to a second designated position different from the start point for winding according to winding requirements, and setting the second designated position as an end point for winding; and activating the winding assembly to make the automatic line guide assembly reciprocate between the start point and the end point for winding to achieve automatic and uniform winding.

The advantages and beneficial effects of the present application are as follows.

The automatic winding machine of the present application includes: a line feeding assembly, a winding assembly, an automatic line guide assembly, and an interface screen; the line feeding assembly includes a spool holding frame configured to mount the bulk spool of line for conveying fishing lines; the winding assembly includes a reel spool holding clamp, a fishing reel holding clamp, and a first driving mechanism; the reel spool holding clamp and the fishing reel holding clamp are respectively configured to mount a winding spool or a fishing reel for receiving a fishing line; and the first driving mechanism is configured to drive the winding spool or the fishing reel to rotate so as to generate a winding traction force; the automatic line guide assembly includes a line guide tip shaft and a second driving mechanism, and the line guide tip shaft is configured to guide the fishing line between the line feeding assembly and the winding assembly; and the second driving mechanism is configured to drive the line guide tip shaft to reciprocate in a direction parallel to the winding spool or an axis of the fishing reel to control the placement of the fishing line on the winding spool and the fishing reel; and the interface screen is electrically connected to the first and the second driving mechanisms for controlling winding speed and winding area of the winding spool or fishing reel. The present application can realize the reciprocating traction movement of a fishing line along a direction parallel to the winding spool or an axis of the fishing reel through an automatic line guide assembly, thereby realizing automatic and uniform line distribution during a winding process without manual line guidance, making the winding process more convenient and precise, saving manpower and time, and facilitating the production and use of fishing tackle.

BRIEF DESCRIPTION OF DRAWINGS

Various other advantages and benefits will become apparent to those skilled in the art by reading the detailed description of the embodiments below. The accompanying drawings are provided solely for the purpose of illustrating preferred embodiments and should not be construed as limiting the scope of the present application. Moreover, throughout the drawings, same numeral references are used to designate like components. Among the figures.

Figure 1:
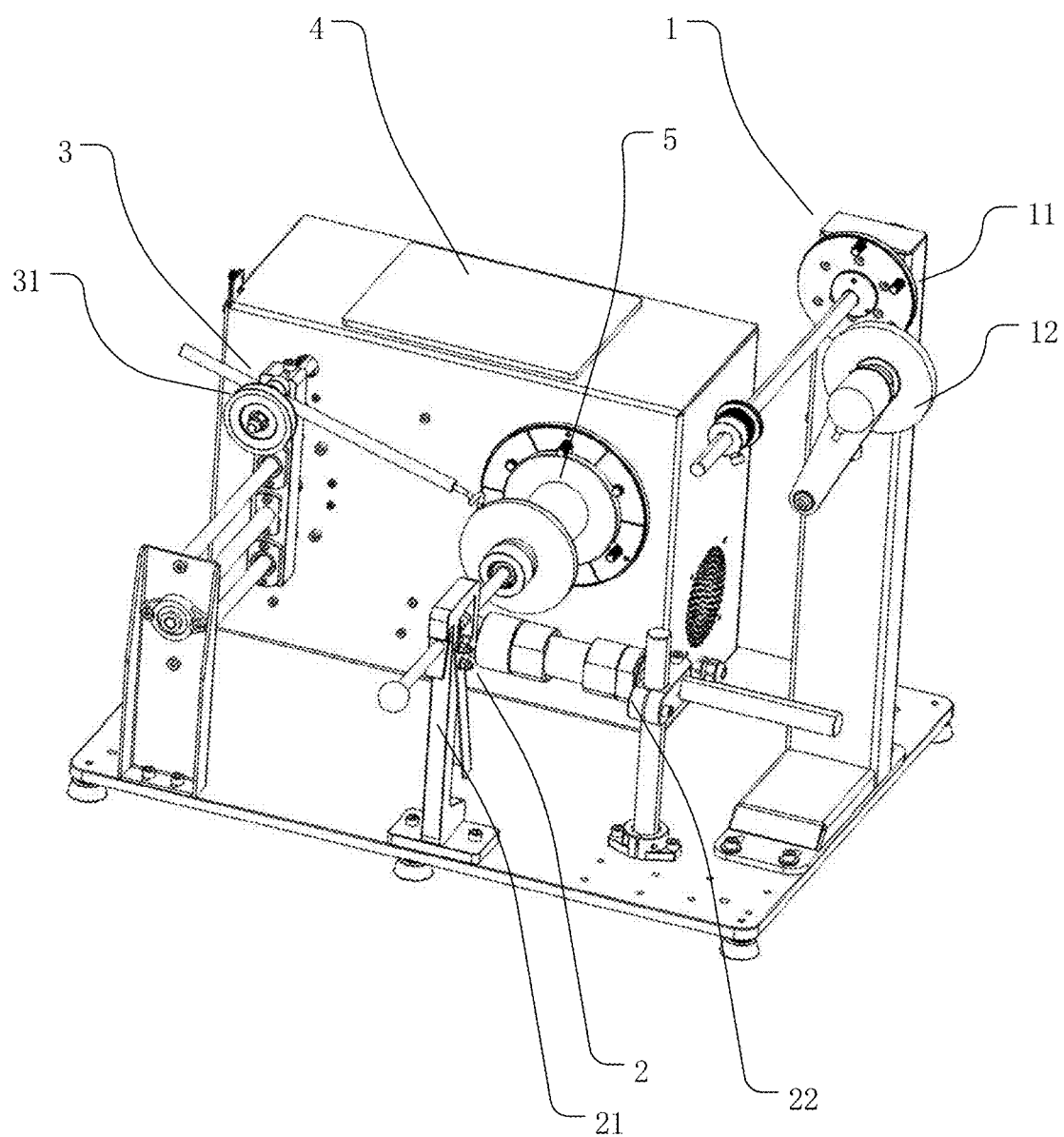
FIG. 1 is an axonometric schematic diagram of an automatic winding machine according to an embodiment of the present application, shown in a winding state of the winding spool.

Numerical references: 1. line feeding assembly; 11. spool holding frame; 111. frame; 112. bulk spool holding disk; 113. bulk spool holding rod; 114. spool locking collar; 12. line counter; 2. winding assembly; 21. reel spool holding clamp; 211. spool holding adapter; 212. elastic clamping mechanism; 22. fishing reel holding clamp; 221. fishing reel mounting rod; 23. winding motor; 231. reel handle turning arm; 3. automatic line guide assembly; 31. line guide tip shaft; 311. line guide roller; 312. line guide tip; 313. line guide gear rod; 314. adjustment block; 315. line guide support; 316. line guide shaft; 32. line guide motor; 4. interface screen; 5. winding spool; 6. bulk spool of line.

DETAILED DESCRIPTION OF THE EMBODIMENTS

In order to make the objectives, technical solutions and advantages of this application clearer, the technical solution of this application will be clearly and completely described below in conjunction with specific embodiments of this application and the corresponding drawings. It should be understood that the described embodiments are merely illustrative of the present application and are not exhaustive. All other embodiments, derived by those of ordinary skill in the art without departing from the scope of the present application are intended to be included within the protective scope of this application.

The technical solutions provided by various embodiments of the present application are described in detail below in conjunction with the accompanying drawings.

It should be noted that the embodiments and the features thereof in the present application may be combined with each other without conflict. The present application will be described in detail below with reference to the accompanying drawings and in combination with embodiments.

It should be noted that the following detailed description is illustrative, and is intended to provide further explanation of the present application. Unless otherwise specified, all technical and scientific terms used herein have the same meaning as those commonly understood by those skilled in the art to which the present application pertains.

For ease of description, spatial relative terms can be used here, such as "on," "above," "on the upper surface of," and "upper," to describe the spatial position relationship between a device or feature as shown in the figure and other devices or features. It should be understood that the spatial relative term is intended to include different orientations of the device in use or operation other than those described in the figure. For example, if the device in the figure is inverted, the device described as being "above" or "on top of" another device or structure" would then be oriented as "below" or "under" the other device or structure. Thus, the exemplary term "above" can include both "above" and "below" orientations. The device can also be positioned 90 degrees or in other orientations, and the spatial relative description used here is interpreted accordingly.

It should be noted that the terminology used herein are only for the purpose of describing specific embodiments and are not intended to limit exemplary embodiments in accordance with the present application. Unless the context clearly indicates otherwise, the singular forms used herein are also intended to include the plural forms, and it should be further understood that when the words "comprises" and/or "includes" are used in this specification they indicate the existence of features, steps, operations, devices, components, and/or combinations thereof.

It should be noted that the terms "first", "second" and so on in the specification, claims and drawings of this application are configured to distinguish similar objects, but not necessarily configured to describe a specific sequence or precedence. It should be understood that the data thus used may be interchangeable under appropriate circumstances so that embodiments of the present application described herein can be implemented in sequences other than those illustrated or described herein. In addition, the terms "comprising" and "having" and any variation thereof are intended to cover non-exclusive inclusions, for example, a process, method, system, product or device that includes a series of steps or units need not be limited to those steps or units explicitly listed, but may include other steps or units that are not explicitly listed or inherent to these processes, methods, products or devices.

FIGS. 1 to 5 schematically show an embodiment of the automatic winding machine of the present application.

As shown in FIGS. 1 to 5, the present application discloses an automatic winding machine. The automatic winding machine includes a line feeding assembly 1, a winding assembly 2, an automatic line guide assembly 3, and an interface screen 4.

The line feeding assembly 1 includes a spool holding frame 11 configured to mount a bulk spool of line 6 for conveying fishing lines and providing a line source.

The winding assembly 2 includes a reel spool holding clamp 21, a fishing reel holding clamp 22, and a first driving mechanism. The reel spool holding clamp 21 and the fishing reel holding clamp 22 are respectively configured to mount a winding spool 5 or a fishing reel for receiving a fishing line, so as to achieve compatibility with the winding spool 5 and the integrated fishing reel. The first driving mechanism is configured to drive the winding spool 5 or the fishing reel to rotate to generate a winding traction force, thereby enabling the winding function.

The automatic line guide assembly 3 includes a line guide tip shaft 31 and a second driving mechanism, the line guide tip shaft 31 is configured to pull the fishing line between the line feeding assembly 1 and the winding assembly 2, thereby controlling the placement of the fishing line on the winding spool 5 and the fishing reel. The second driving mechanism is configured to drive the line guide tip shaft 31 to reciprocate in a direction parallel to the winding spool 5 or an axis of the fishing reel, so that the fishing line is finally evenly distributed over the winding spool 5 or the fishing reel. This configuration prevents excessive lateral accumulation of the fishing line, improves the winding tightness of the fishing line, and ensures that the fishing line remains securely wound without becoming loose.

The interface screen 4 is electrically connected to the first driving mechanism and the second driving mechanism for controlling winding speed and winding area of the winding spool 5 or fishing reel.

With the above structural design, the automatic winding machine of the present application can be compatible with and meet the winding requirements of fishing reels or winding spools 5. Through the automatic line guide assembly 3, the fishing line is reciprocally driven along a direction parallel to the winding spool 5 or an axis of the fishing reel, thereby realizing an automatic and uniform wiring process without manual wiring. This design simplifies and refines the winding operation, saves manpower and time, and facilitates the production and use of fishing tackle.

Figure 2:
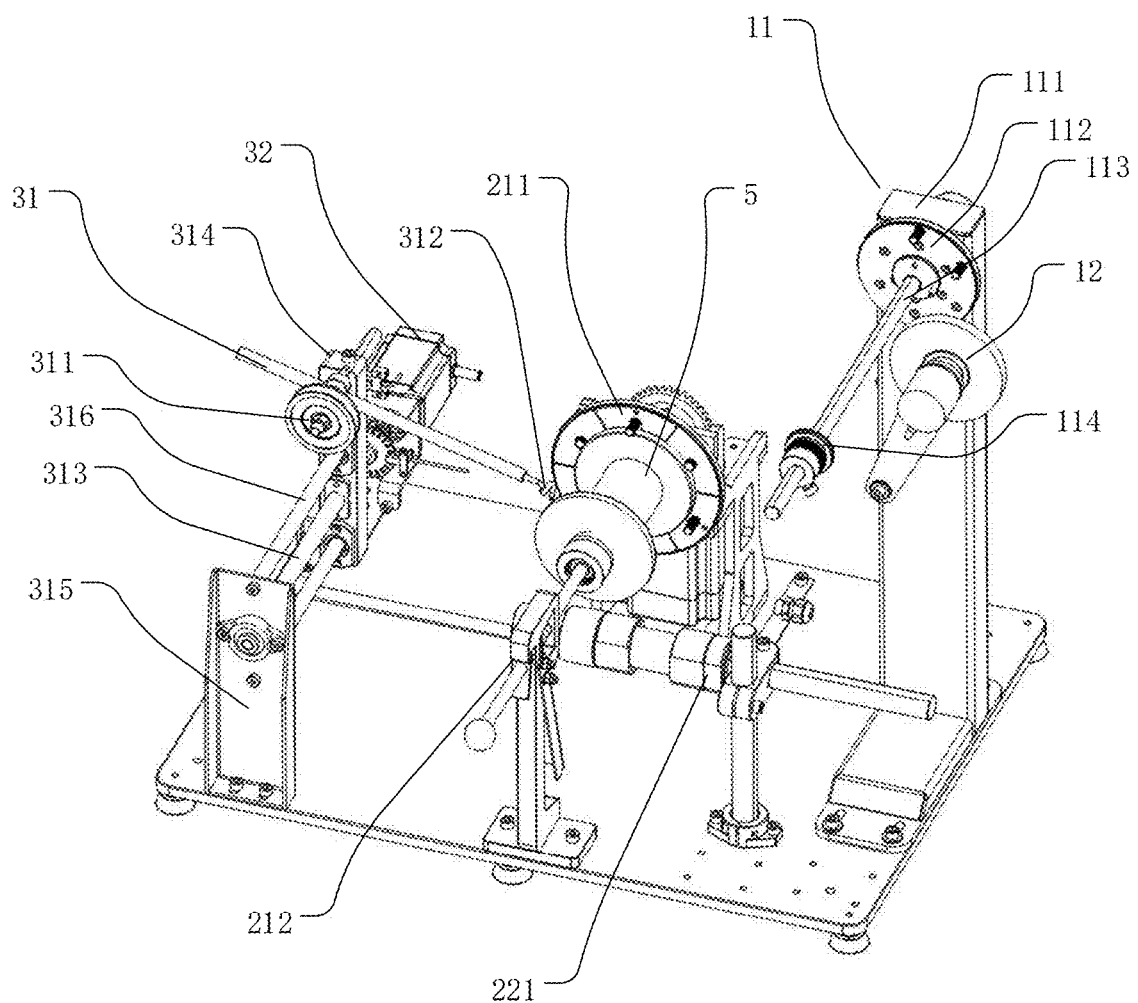
FIG. 2 is a front axonometric schematic diagram of a structure of FIG. 1 after removing a main housing.
Figure 3:
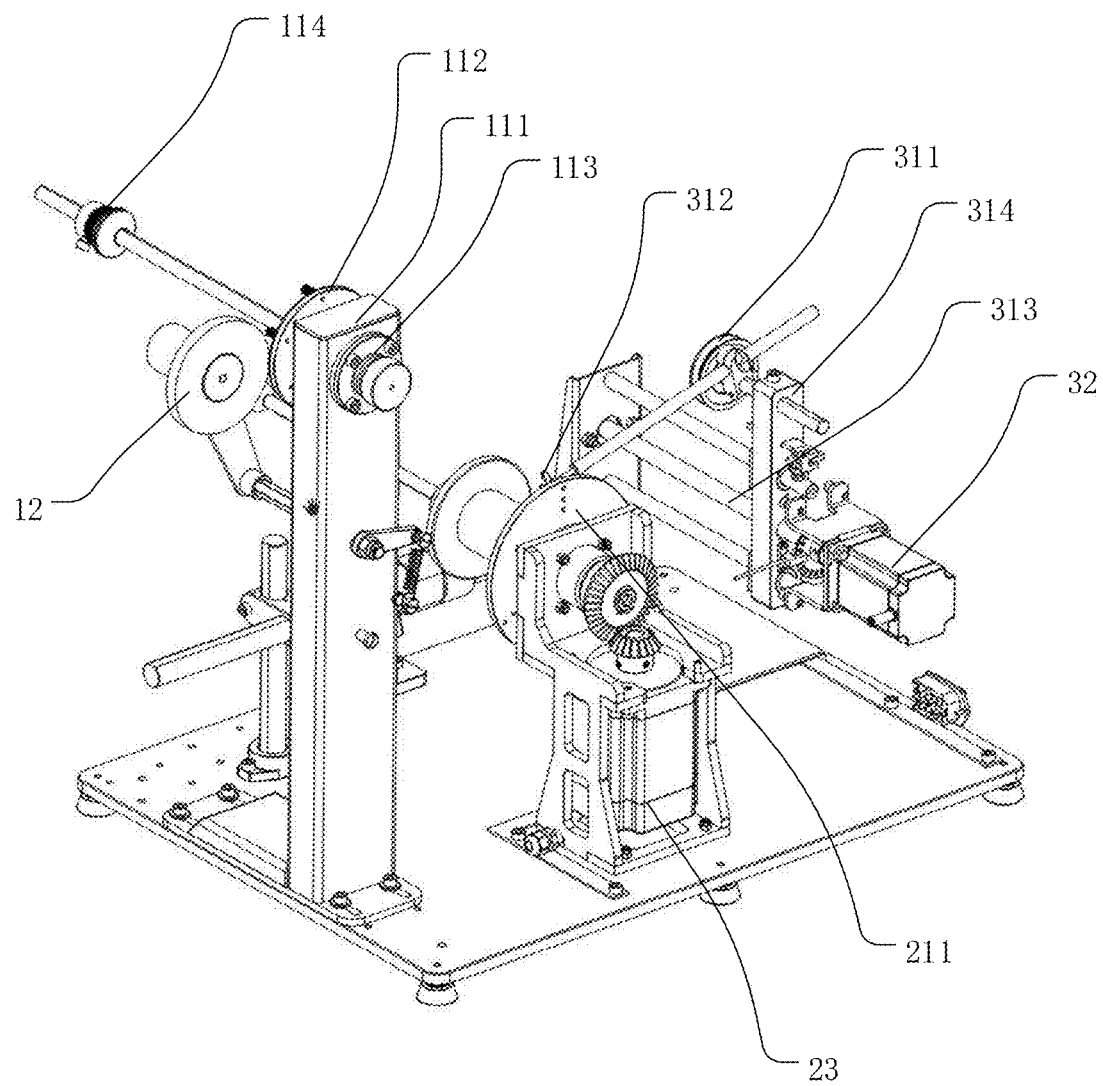
FIG. 3 is a back axonometric schematic diagram of a structure of FIG. 1 after removing a main housing.

In some embodiments of the present application, as shown in FIGS. 2 and 3, the line guide tip shaft 31 includes: a line guide roller 311, a line guide tip 312, a line guide gear rod 313, and an adjustment block 314. The line guide roller 311 and the line guide tip 312 are mounted on the adjustment block 314 and move integrally therewith. The adjustment block 314 is slidably mounted on the line guide gear rod 313 and can perform linear reciprocating motion along the line guide gear rod 313 under the driving action of the line guide gear rod 313's rotation. The fishing line is routed the line guide roller 311 and exits through the line guide tip 312, thereby changing the winding distribution position under the movement of the line guide roller 311 and the line guide tip 312. The second driving mechanism is a line guide motor 32, the line guide gear rod 313 is connected to an output end of the line guide motor 32, and the line guide motor 32 drives the line guide roller 311 and the line guide tip 312 to reciprocate linearly by driving the line guide gear rod 313 to rotate, thereby causing the fishing line to be wound back and forth within a defined range, achieving uniform distribution, preventing excessive concentration of the winding position that may cause the fishing line to loosen, and improving the precision of the winding process.

In some embodiments of the present application, as shown in FIG. 2, the line guide tip shaft 31 further includes a line guide support 315 and line guide shafts 316. An end of the line guide gear rod 313 is rotatably mounted on the line guide support 315 through a rotating bearing and can rotate smoothly. The line guide shafts 316 are fixedly mounted on the line guide support 315 parallel to the line guide gear rod 313, and pass through the adjustment block 314 to guide its linear movement. In the embodiment shown in FIG. 2 of this application, two line guide shafts 316 are provided, respectively arranged above and below the line guide gear rod 313, providing a reliable guiding effect for the linear movement of the adjustment block 314, ensuring the motion stability of the adjustment block 314, and improving the winding accuracy.

Figure 4:
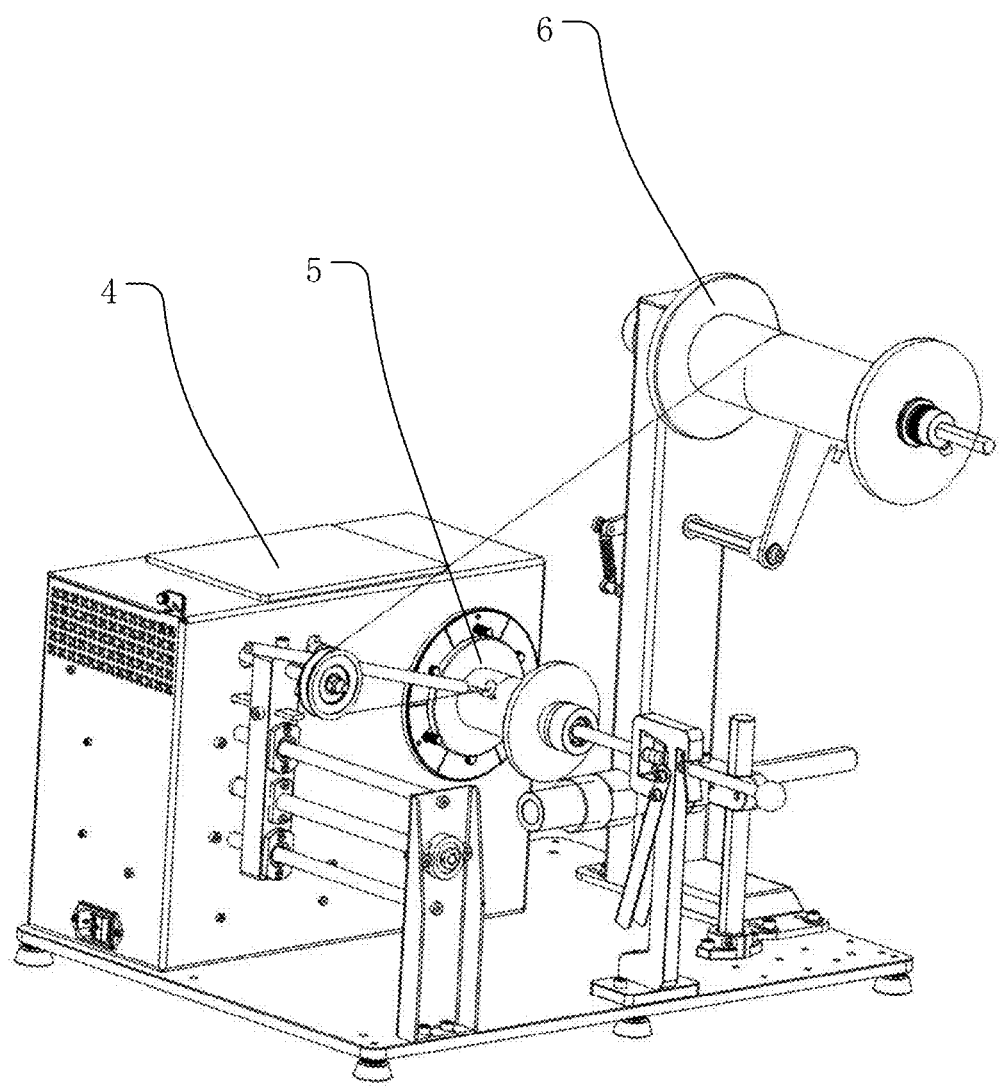
FIG. 4 is a schematic diagram illustrating a winding method of the automatic winding machine in the state shown in FIG. 1.

In some embodiments of the present application, as shown in FIGS. 1 to 3, the reel spool holding clamp 21 includes a spool holding adapter 211 and an elastic clamping mechanism 212. Both the spool holding adapter 211 and the elastic clamping mechanism 212 are detachable components and can be disassembled and reassembled according to a winding target (i.e., the winding spool 5 or the integrated fishing reel). When winding the winding spool 5 is required, as shown in FIGS. 1 to 4 of this application, the spool holding adapter 211 and the elastic clamping mechanism 212 are both in an equipped state. The spool holding adapter 211 is provided with a fixing pin, and the spool holding adapter 211 is configured to engage with a positioning hole of the winding spool 5 to drive it to rotate coaxially. Specifically, the fixing pin of the spool holding adapter 211 is provided with a variety of specifications, which can be compatible with coupling winding spools 5 of different sizes to achieve secure fixation. The elastic clamping mechanism 212 applies an elastic force to push the winding spool 5, clamping it tightly against the spool holding adapter 211, thereby ensuring that the winding spool 5 is closely fitted to and rotates with the spool holding adapter 211. As shown in FIG. 4, the top end of a push rod of the elastic clamping mechanism 212 is provided with a rotating ball head structure, which can press the winding spool 5 and rotate coaxially with the winding spool 5. The first driving mechanism is a winding motor 23, an output end of the winding motor 23 is detachably connected to the spool holding adapter 211, and the winding motor 23 drives the winding spool 5 to rotate and generating a winding traction force. Specifically, the output end of the winding motor 23 is connected to the spool holding adapter 211 via a bevel gear set.

In addition, in some embodiments of the present application, a silicone anti-slip pad is further provided on a surface of the spool holding adapter 211. When the specifications of the winding spool 5 are not suitable for coupling and fixing by a fixing pin, the frictional force of the silicone anti-slip pad can be configured to coaxially wind the winding spool 5, thereby avoiding slippage and jumping between the winding spool 5 and the spool holding adapter 211 during a winding process.

Figure 5:
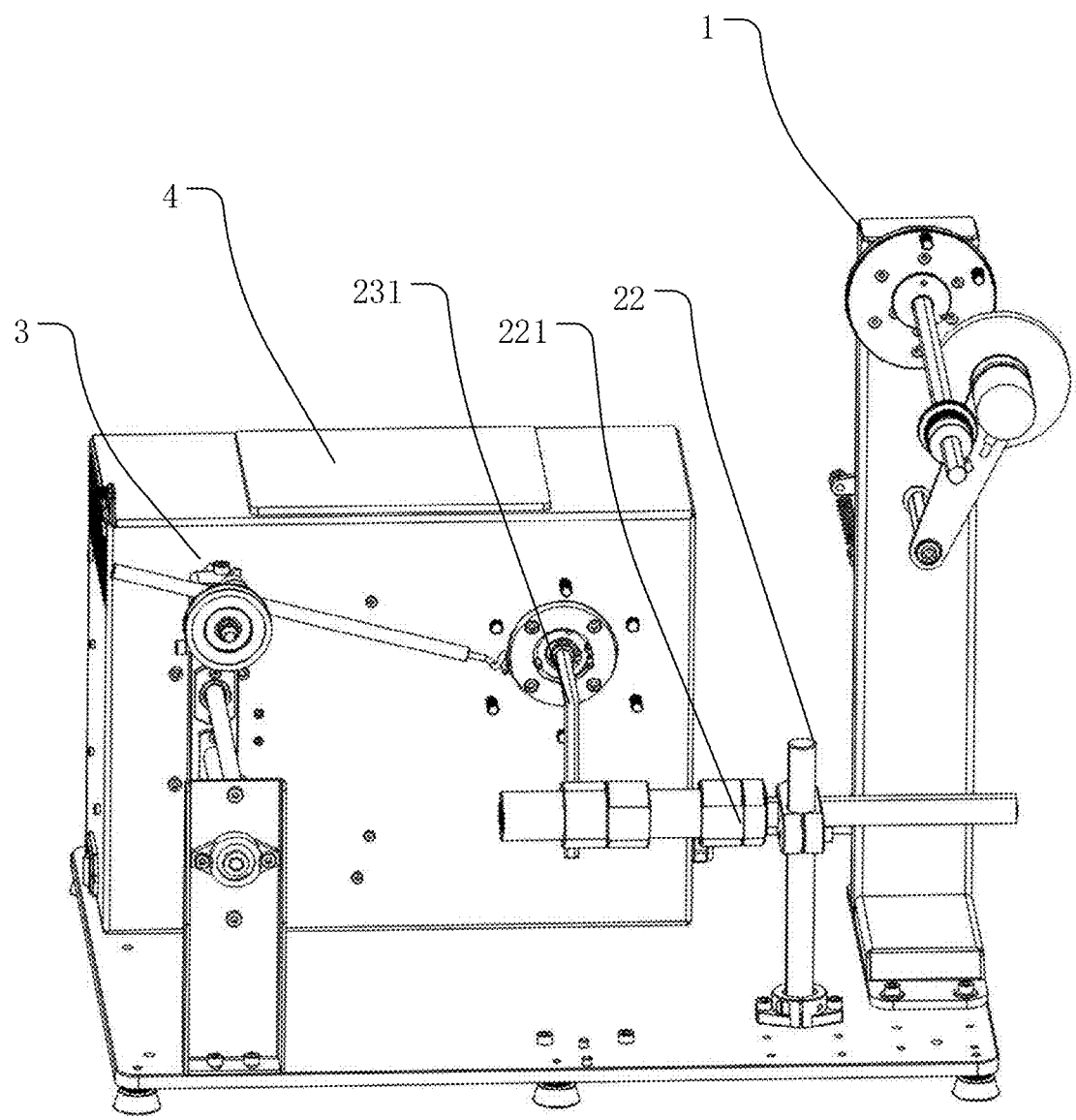
FIG. 5 is an axonometric schematic diagram of an automatic winding machine according to an embodiment of the present application, shown in a winding state of the fishing reel.

In some embodiments of the present application, as shown in FIGS. 1, 2 and 5, the fishing reel holding clamp 22 includes a fishing reel mounting rod 221, which is configured to be fixedly connected to a base of the fishing reel to achieve fixed mounting of the fishing reel. As shown in FIG. 5, when it is necessary to wind an integrated fishing reel, the reel spool holding clamp 21 can be removed to free up space for mounting the fishing reel. Meanwhile, the spool holding adapter 211 is removed and a detachable reel handle turning arm 231 is mounted at the output end of the winding motor 23. After the fishing reel is mounted, a spool of the fishing reel is aligned with the axial direction of the winding spool 5 shown in FIG. 1, and a handle of the fishing reel can contact the reel handle turning arm 231. The winding motor 23 drives the reel handle turning arm 231 to push the handle of the fishing reel, thereby causing the spool to generate a winding traction force.

Referring to the embodiments shown in FIGS. 1, 2 and 5, in some embodiments of the present application, the fishing reel mounting rod 221 can be mounted by an upright post and a buckle. In operation, the mounting height of the fishing reel mounting rod 221 can be adjusted to accommodate fishing reels of different sizes and shapes, such as baitcasting reels, drum reels, and spinning reels, thereby improving the adaptability of the automatic winding machine of the present application.

In some embodiments of the present application, as shown in FIGS. 1 to 3, the spool holding frame 11 includes a frame 111, a bulk spool holding disk 112, a bulk spool holding rod 113, and a spool locking collar 114. The bulk spool holding rod 113 is rotatably mounted on the frame 111, with the bulk spool holding disk 112 mounted on one side of the bulk spool holding rod 113 and the spool locking collar 114 mounted on the opposite side. The bulk spool holding disk 112 is provided with a fixing pin, which is configured to engage the bulk spool holding disk 112 with a positioning hole on the bulk spool of line 6 to secure it in place. The spool locking collar 114 presses the bulk spool of line 6 against the bulk spool holding disk 112 to prevent the bulk spool of line 6 from disengaging. Similar to the structure of the spool holding adapter 211, the fixing pin on the bulk spool holding disk 112 is further provided in various specifications to accommodate bulk spools of line 6 of different specifications. In addition, a silicone anti-slip pad is further provided on a surface of the bulk spool holding disk 112. The spool locking collar 114 and the bulk spool holding disk 112 are further provided with opposing conical protrusions, and the conical protrusions can extend into a spool hole of the bulk spool of line 6 to increase the contact area therewith. By tightly clamping the fixed bulk spool of line 6, slippage between the bulk spool of line 6 and the bulk spool holding rod 113 is prevented.

In some embodiments of the present application, as shown in FIG. 3, the bulk spool holding rod 113 is a damping adjustable structure that can adjust the rotational resistance to accommodate different winding tensions required by various fishing lines, thereby matching the winding requirements of different types of fishing lines, and ensuring the safety and tightness of fishing line winding with appropriate tension.

In some embodiments of the present application, as shown in FIGS. 1 to 3, the line feeding assembly 1 further includes a line counter 12, the line counter 12 is mounted on the spool holding frame 11 and electrically connected to the interface screen 4, serving to provide feedback to the interface screen 4 regarding the line feeding length of the bulk spool of line 6, so that the interface screen 4 can monitor and display the real-time winding speed.

In some embodiments of the present application, the interface screen 4 includes a display mechanism and an input mechanism. The display mechanism may be, for example, a liquid crystal display for displaying information such as winding speed and/or winding length. The input mechanism may be, for example, a key or a touch screen for setting a start point and an end point of the winding position on the winding spool 5 or the fishing reel. Based on the user-input information, the interface screen 4 can control the line guide motor 32 to drive the line guide tip shaft 31 to reciprocate between the start and the end points of the winding position, thereby achieving automatic line guidance, ensuring uniform winding, and preventing over-biased or vacant winding.

In some embodiments of the present application, the input mechanism is further configured to receive manual adjustment instructions, thereby allowing monitoring personnel to monitor and manually intervene in the winding position to correct the positional deviation of the line guide tip shaft 31 during a winding process.

Figure 6:
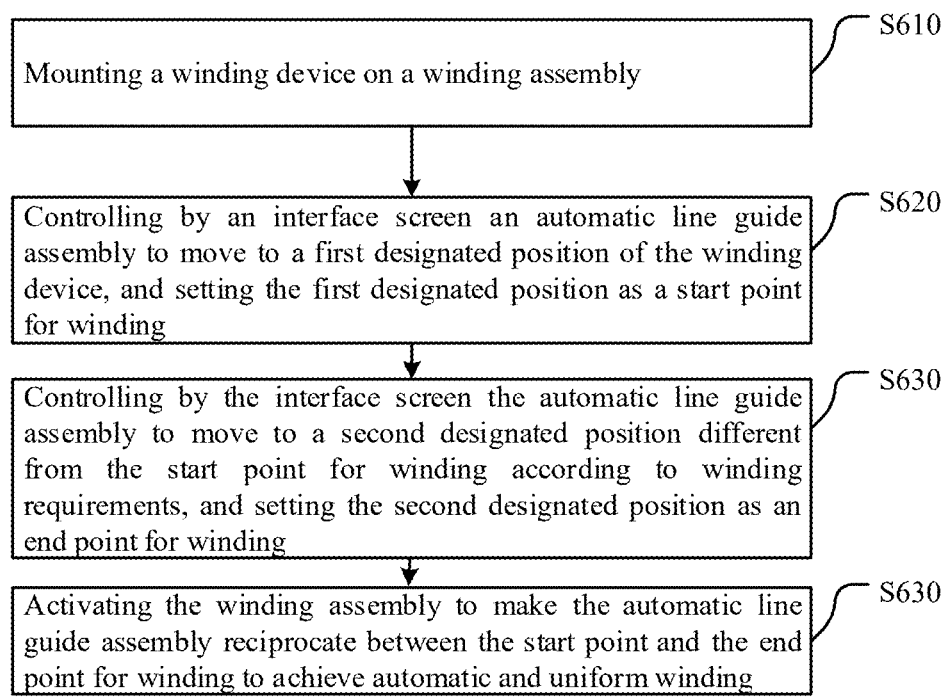
FIG. 6 is a flow chart of an automatic winding method according to an embodiment of the present application.

As shown in FIG. 6, the present application further discloses an automatic winding method for use with an automatic winding machine as described in any of the foregoing embodiments. As shown in FIG. 6, the method includes the following steps.

At S610, a winding device is mounted on a winding assembly. Specifically, the winding device may be a single winding spool or an integrated fishing reel including a winding spool.

At S620, an interface screen causes an automatic line guide assembly to move to a first designated position of the winding device, and sets the first designated position as a start point for winding.

At S630, the interface screen causes the automatic line guide assembly to move to a second designated position different from the start point for winding according to winding requirements, and sets the second designated position as an end point for winding. Specifically, the determination of the second position can be made according to requirements for the winding spool size, winding amount and turn thickness. For example, it can be easily visually determined by fishing enthusiasts according to their own needs, or it can also be determined in advance by professional production personnel through pre-calculation.

At S640, the winding assembly is activated to drive the automatic line guide assembly reciprocate between the start and end points for winding to achieve automatic and uniform winding.

By means of the above method, the present application realizes the operation of freely determining the winding area and automatically and evenly winding in the determined area. The need for manual adjustment of the position of the fishing line winding can be eliminated, thereby saving manpower and improving the uniformity and accuracy of the fishing line winding.

In some embodiments of the present application, the automatic winding method further includes: during the reciprocating movement of the automatic line guide assembly, manually inputting instructions to the interface screen to fine-tune the position of the automatic line guide assembly, i.e., to adjust the position of the line guide tip shaft by driving the second driving mechanism, and/or, manually inputting instructions to adjust the positions of the start and end points for winding. By manually inputting control instructions, uneven winding caused by accidents during the automatic line guide process can be corrected in time, and the winding requirements for temporary changes can be met, thereby enhancing the flexibility in defining a winding area.

Referring to FIGS. 1 to 5, the working principle of the winding device of this application is explained as follows.

When winding a separate winding spool 5, the winding assembly 2 is configured with a reel spool holding clamp 21, which includes a spool holding adapter 211 and an elastic clamping mechanism 212. The elastic clamping mechanism 212 presses the winding spool 5 against the spool holding adapter 211. Under this squeezing force, the spool holding adapter 211 fixes the winding spool 5 by a fixing pin or a silicone anti-slip pad. Driven by a winding motor 23, the spool holding adapter 211 rotates, thereby driving the winding spool 5 to rotate and generate a winding traction force to transfer the fishing line from the bulk spool of line 6 onto the winding spool 5. Moreover, the line guide motor 32 drives the line guide gear rod 313 to rotate, thereby driving the adjustment block 314 to drive the line guide roller 311 and the line guide tip 312 to reciprocate linearly, evenly arranging the fishing line on the winding spool 5, and realizing automatic line arrangement and winding. Specifically, the driving operation of the line guide motor 32 follows the left and right limit positions of winding input by the user. When a deviation in these positions is identified, the user may correct at any time by means of an input mechanism to correct the position of the moving line guide roller 311 and the line guide tip 312. Alternatively, the left and right limit positions (i.e. start point and end point for winding) can be refined directly to accommodate temporary changes in winding requirements.

When winding a larger integrated fishing reel, the winding assembly 2 removes the reel spool holding clamp 21 to create sufficient installation space. Moreover, the output end of the winding motor 23 is connected to the reel handle turning arm 231. The fishing reel is fixedly mounted by the fishing reel bulk spool holding rod 113, and the spool of the fishing reel coincides with the axis of the reel handle turning arm 231 by means of position adjustment. Driven by the winding motor 23, the reel handle turning arm 231 rotates and pushes the handle of the fishing reel to rotate, so that the spool of the fishing reel rotates and generates a winding traction force to transfer the fishing line from the bulk spool of line 6 onto the winding spool 5. The operation of the line guide motor 32 in this process is the same as when winding the winding spool 5, which can be referred to as described above, and will not be repeated here.

In summary, the automatic winding machine of the present application includes: a line feeding assembly, a winding assembly, an automatic line guide assembly, and an interface screen. The line feeding assembly includes a spool holding frame configured to mount the bulk spool of line for conveying fishing lines. The winding assembly includes a reel spool holding clamp, a fishing reel holding clamp, and a first driving mechanism; the reel spool holding clamp and the fishing reel holding clamp are respectively configured to mount a winding spool or a fishing reel for receiving a fishing line; and the first driving mechanism is configured to drive the winding spool or the fishing reel to rotate so as to generate a winding traction force. The automatic line guide assembly includes a line guide tip shaft and a second driving mechanism, the line guide tip shaft is configured to guide the fishing line between the line feeding assembly and the winding assembly, and the second driving mechanism is configured to drive the line guide tip shaft to reciprocate in a direction parallel to the winding spool or an axis of the fishing reel to control the placement of the fishing line on the winding spool and the fishing reel. The interface screen is electrically connected to the first driving mechanism and the second driving mechanism for controlling winding speed and winding area of the winding spool or fishing reel. The automatic winding machine of the present application can be compatible with and meet the winding requirements of fishing reels or winding spools. By means of the automatic line guide assembly, a fishing line is subjected to reciprocating traction along a direction parallel to the winding spool or an axis of the fishing reel, thereby realizing an automatic and uniform line guide process without manual line guidance, making the winding process more efficient and precise, saving manpower and time, and facilitating the production and use of fishing tackle.

The foregoing description is merely illustrative of specific embodiments of the present application. In light of the teachings provided herein, those skilled in the art can make other modification and alterations based on the above embodiments. Those skilled in the art should understand that the above specific description is intended solely to illustrate the principle and purpose of this application, and the scope of protection shall be defined by claims.

What is claimed is:

1. An automatic winding machine, comprising a line feeding assembly, a winding assembly, an automatic line guide assembly, and an interface screen;

the line feeding assembly includes a spool holding frame configured to mount a bulk spool of line for conveying fishing lines;

the winding assembly includes a reel spool holding clamp, a fishing reel holding clamp, and a first driving mechanism; the reel spool holding clamp and the fishing reel holding clamp are respectively configured to mount a winding spool or a fishing reel for receiving a fishing line; and the first driving mechanism is configured to drive the winding spool or the fishing reel to rotate so as to generate a winding traction force;

the automatic line guide assembly includes a line guide tip shaft and a second driving mechanism, the line guide tip shaft is configured to guide the fishing line between the line feeding assembly and the winding assembly to control the placement of the fishing line on the winding spool and the fishing reel; and the second driving mechanism is configured to drive the line guide tip shaft to reciprocate in a direction parallel to the winding spool or an axis of the fishing reel so that the fishing line is evenly distributed; and the interface screen is electrically connected to the first driving mechanism and the second driving mechanism for controlling winding speed and winding area of the winding spool or fishing reel;

wherein the spool holding frame comprises a frame, a bulk spool holding disk, a bulk spool holding rod, and a spool locking collar; the bulk spool holding rod is rotatably mounted on the frame, the bulk spool holding disk is mounted on one side of the bulk spool holding rod, and the spool locking collar is mounted on the other side thereof; the bulk spool holding disk is provided with a fixing pin, which is configured to engage the bulk spool holding disk with a positioning hole on the bulk spool of line to secure it in place; and the spool locking collar presses the bulk spool of line against the bulk spool holding disk to prevent the bulk spool of line from disengaging.

2. The automatic winding machine according to claim 1, wherein the line guide tip shaft comprises a line guide roller, a line guide tip, a line guide gear rod, and an adjustment block; the line guide roller and the line guide tip are mounted on the adjustment block, and the adjustment block is slidably mounted on the line guide gear rod; the fishing line is routed the line guide roller and exits through the line guide tip; and the second driving mechanism is a line guide motor, the line guide gear rod is connected to an output end of the line guide motor, and the line guide motor drives the line guide roller and the line guide tip to reciprocate linearly by driving the line guide gear rod to rotate.

3. The automatic winding machine according to claim 2, wherein the line guide tip shaft further comprises a line guide support and line guide shafts; an end of the line guide gear rod is mounted on the line guide support through a rotating bearing; the line guide shaft is fixedly mounted on the line guide support parallel to the line guide gear rod, and the line guide shaft passes through the adjustment block to guide the adjustment block to move linearly.

4. The automatic winding machine according to claim 1, wherein the reel spool holding clamp comprises a spool holding adapter and an elastic clamping mechanism, both the spool holding adapter and the elastic clamping mechanism are detachable components; the spool holding adapter is provided with a fixing pin configured to engage with a positioning hole of the winding spool to drive the winding spool to rotate coaxially; the elastic clamping mechanism exerts pressure on the winding spool, securing it tightly against the spool holding adapter; and the first driving mechanism is a winding motor, an output end of the winding motor is detachably connected to the spool holding adapter, and the winding motor drives the winding spool to rotate by rotating the spool holding adapter to generate a winding traction force.

5. The automatic winding machine according to claim 4, wherein the fishing reel holding clamp comprises a fishing reel mounting rod, and the fishing reel mounting rod can be fixedly connected to a base of the fishing reel; and the output end of the winding motor is further equipped with a detachable reel handle turning arm which engages with a handle of the fishing reel, and the winding motor drives the reel handle turning arm to rotate the handle of the fishing reel, thereby generating a winding traction force.

6. The automatic winding machine according to claim 1, wherein the bulk spool holding rod is a damping adjustable structure that can adjust the rotational resistance to accommodate different winding tensions required by various fishing lines.

7. The automatic winding machine according to claim 1, wherein the line feeding assembly further comprises a line counter, the line counter is mounted on the spool holding frame and electrically connected to the interface screen, serving to provide feedback to the interface screen regarding the line feeding length of the bulk spool of line.

8. The automatic winding machine according to claim 1, wherein the interface screen comprises a display mechanism and an input mechanism; the display mechanism is configured to display a winding speed and/or a winding length; the input mechanism is configured to set a start point and an end point of the winding position on the winding spool or the fishing reel; the interface screen causes the second driving mechanism to drive the line guide tip shaft to reciprocate between the start and the end points of the winding position; and the input mechanism is further configured to receive manual adjustment instructions to correct positional deviations of the line guide tip shaft during a winding process.

9. An automatic winding method, applied to the automatic winding machine according to claim 1, comprising the steps of:

mounting a winding device on a winding assembly;

controlling by the interface screen the automatic line guide assembly to move to a first designated position of the winding device, and setting the first designated position as a start point for winding;

controlling by the interface screen the automatic line guide assembly to move to a second designated position different from the start point for winding according to winding requirements, and setting the second designated position as an end point for winding; and activating the winding assembly to make the automatic line guide assembly reciprocate between the start point and the end point for winding to achieve automatic and uniform winding.

\* \* \* \* \*